US011371626B2

(12) United States Patent
Mang et al.

(10) Patent No.: US 11,371,626 B2
(45) Date of Patent: Jun. 28, 2022

(54) ELECTROMAGNETIC ACTUATOR WITH BEARING ELEMENT

(71) Applicant: SVM Schultz Verwaltungs—GmbH & Co. KG, Memmingen (DE)

(72) Inventors: Helmut Mang, Memmingen (DE); Florian Schreiber, Weißenhorn (DE); Johannes Scholz, Pfaffenhausen (DE); Matthias Frieß, Memmingen (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 98 days.

(21) Appl. No.: 16/678,415

(22) Filed: Nov. 8, 2019

(65) Prior Publication Data

US 2020/0149652 A1    May 14, 2020

(30) Foreign Application Priority Data

Nov. 9, 2018 (DE) .......................... 102018128144.7

(51) Int. Cl.
*F16K 31/06* (2006.01)
*H01F 7/16* (2006.01)
(52) U.S. Cl.
CPC ...... *F16K 31/0668* (2013.01); *F16K 31/0644* (2013.01); *H01F 7/1607* (2013.01); *H01F 2007/163* (2013.01)
(58) Field of Classification Search
CPC ............. F16K 31/0664; F16K 31/0668; H01F 7/1607; H01F 2007/163
USPC .................................................... 251/129.15
See application file for complete search history.

(56) References Cited

U.S. PATENT DOCUMENTS

| 5,853,028 | A | 12/1998 | Ness et al. | |
| 6,644,622 | B2 * | 11/2003 | Modien | F16K 31/0655 |
| | | | | 251/129.01 |
| 6,720,853 | B1 * | 4/2004 | Callis | F16K 31/0644 |
| | | | | 335/258 |
| 7,082,965 | B2 * | 8/2006 | Holmes | F16D 25/14 |
| | | | | 137/625.65 |

(Continued)

FOREIGN PATENT DOCUMENTS

DE   102007061862 A1 *  6/2009  ............... F01L 1/34
DE   102007061862 A1     6/2009
(Continued)

OTHER PUBLICATIONS

Search Report for German Application No. 102018128144.7 dated Oct. 25, 2019 (12 pages).

(Continued)

*Primary Examiner* — Matthew W Jellett
(74) *Attorney, Agent, or Firm* — Reising Ethington, P.C.

(57) ABSTRACT

The disclosure relates to an electromagnetic actuator for actuating a valve. The actuator has a housing, a core and a yoke. A coil body, which carries at least one coil winding, is arranged in the housing. The coil body encloses an armature space at least to some extent. An armature is arranged within the armature space such that it can be moved in its axial direction. A bearing element is arranged on the yoke and has a disc-shaped fastening portion and a tubular bearing portion, which bears the armature. The bearing portion projects inwards from the fastening portion.

14 Claims, 1 Drawing Sheet

(56) References Cited

U.S. PATENT DOCUMENTS

| | | | |
|---|---|---|---|
| 7,404,540 B2* | 7/2008 | Cocca | F16K 31/0644 |
| | | | 123/568.26 |
| 7,487,798 B2* | 2/2009 | Furuta | F16K 31/0613 |
| | | | 335/262 |
| 9,644,588 B2* | 5/2017 | Wieland | F16K 31/0613 |
| 2007/0176720 A1 | 8/2007 | Janssen et al. | |
| 2011/0220826 A1* | 9/2011 | Hoppe | F01L 1/3442 |
| | | | 251/129.15 |

FOREIGN PATENT DOCUMENTS

| | | |
|---|---|---|
| DE | 102016213984 A1 | 2/2018 |
| DE | 102016123827 A1 | 6/2018 |
| DE | 102016124010 A1 | 6/2018 |
| EP | 0465813 A1 | 1/1992 |

OTHER PUBLICATIONS

European Search Report for Application No. 19207546.3 dated Mar. 27, 2020 (10 pages).

* cited by examiner

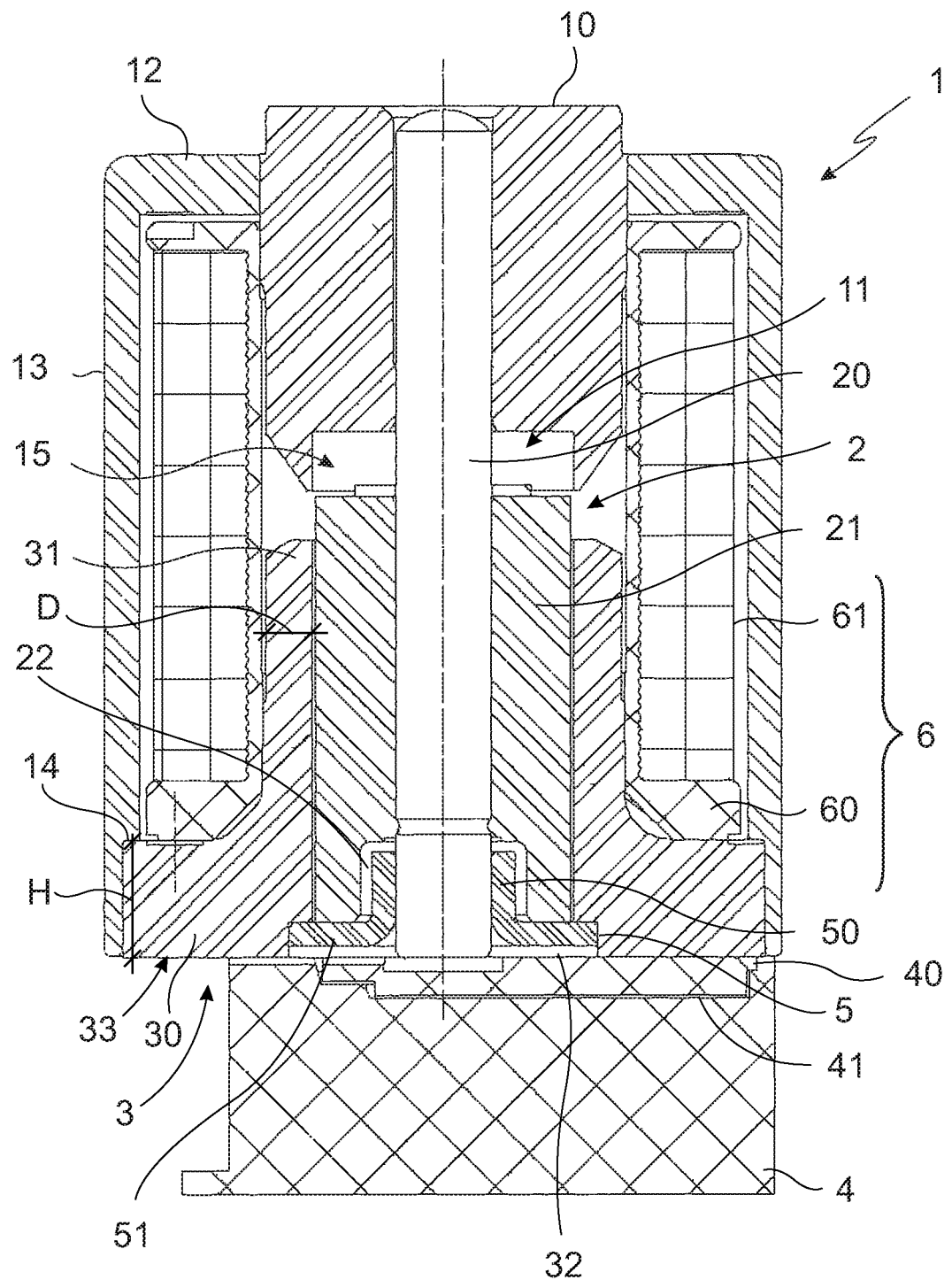

ELECTROMAGNETIC ACTUATOR WITH BEARING ELEMENT

CROSS-REFERENCE TO RELATED APPLICATION

This application claims the benefit of German Patent Application No. 10 2018 128 144.7, filed Nov. 9, 2018.

INTRODUCTION

The disclosure relates to an electromagnetic actuator for actuating a valve. The electromagnetic actuator comprises a housing, a core and a yoke, which are arranged opposite one another on the housing or in the housing, also comprises a coil body, which carries at least one coil winding, is arranged within the housing and encloses an armature space at least to some extent, and further comprises an armature, which is arranged within the armature space such that it can be moved in an axial direction. The electromagnetic actuator additionally comprises a bearing element, which is fixed on the yoke and has a disc-shaped, in particular annular-disc-shaped, fastening portion and a tubular bearing portion, which bears the armature and is formed in one piece on the fastening portion.

Such electromagnetic actuators are known in the prior art and serve to actuate a mechanically linearly actuable device, for example a slide of a valve.

The functioning of the electromagnetic actuator mentioned in the introduction is based on a so-called magnetic circuit, i.e., a closed path of magnetic flux which encloses the housing, the core, the yoke, and the armature. When a voltage is applied to the coil winding, a current flows in the coil winding, as a result of which a magnetic flux is generated in the magnetic circuit of the electromagnetic actuator. The magnetic flux subjects the armature to a force which displaces the armature linearly in the axial direction.

The armature is mounted in the core and in the yoke of the electromagnetic actuator. For this purpose, outer-surface portions of the armature which are arranged in the region of the core and of the yoke are in abutment in each case with corresponding inner-surface portions of the core and of the yoke.

The yoke is usually manufactured using a machining method, in particular by turning. Turned components can be produced with a high level of precision. However, it is relatively costly to manufacture the yoke by turning. In addition, only a rotationally symmetrical yoke can be manufactured by turning, and therefore, if a deviation from the rotational symmetry is desired, at least one further manufacturing step is often required and the production costs of the yoke are increased correspondingly.

It is also possible for the inner-surface portions of the yoke to be provided by a separate bearing element inserted into the yoke. However, the additional bearing element means that the electromagnetic actuator can require a large amount of installation space in the axial direction.

SUMMARY

It is therefore an object of the disclosure according to an embodiment to create an electromagnetic actuator which improves on the aforementioned disadvantages and, while requiring only a small amount of installation space in the axial direction, can be produced cost-effectively.

In an embodiment, the disclosure relates to an electromagnetic actuator for actuating a valve, having a housing, a core and a yoke, which are arranged opposite one another on the housing or in the housing, having a coil body, which carries at least one coil winding, is arranged within the housing and encloses an armature space at least to some extent, having an armature, which is arranged within the armature space such that it can be moved in an axial direction, and having a bearing element, which is fixed on the yoke and has a disc-shaped, in particular annular-disc-shaped, fastening portion and a tubular bearing portion, which bears the armature and is formed in one piece on the fastening portion. The fastening portion serves to fix the bearing element on the yoke, and the bearing portion serves to bear the armature. The disc shape of the fastening portion means that, for the purpose of fastening the bearing element on the yoke in the axial direction, only a small amount of installation space is required in the axial direction. The tubular shape of the bearing portion means that the bearing element provides an axially extended bearing surface for bearing the armature. This shape of the bearing element may therefore be advantageous both in respect of the axial fastening length and in respect of the axial bearing length.

The bearing element preferably consists of metal, per an embodiment. In particular, a bronze or brass has proven to be a successful material to use for the bearing element. However, it is also possible for the bearing element to be in the form of a steel component, in particular of a deep-drawn or of a turned steel component. It is precisely the variant in the form of a deep-drawn steel component which can be quite cost-effective to produce, since it is possible to produce deep-drawn steel components with a sufficient level of accuracy, as are provided in the area of application of a bearing element.

In an embodiment, provision is made for the bearing portion to project inwards from the fastening portion. The inwardly projecting bearing portion further reduces the amount of installation space required by the electromagnetic actuator in the axial direction.

In a further embodiment, provision is made for the yoke to be designed in the form of a sintered component or to be manufactured using a formative method, in particular by means of 3D printing, metal injection moulding, selective laser melting or selective laser sintering. Sintering or formative manufacturing are cost-effective production methods by which, in addition, workpieces of virtually any desired shaped can be produced, with a sufficient level of accuracy, in a single operation. It is consequently possible to avoid high-outlay and costly two-step manufacturing of the yoke by means of turning and milling.

In an embodiment, the disclosure additionally relates to an electromagnetic actuator for actuating a valve, having a housing, a core and a yoke, which are arranged opposite one another on the housing or in the housing, having a coil body, which carries at least one coil winding, is arranged within the housing and encloses an armature space at least to some extent, having an armature, which is arranged within the armature space such that it can be moved in an axial direction, and having an armature-bearing bearing element, which is fixed on the yoke and bears the armature.

In an embodiment, provision is made for the yoke to be designed in the form of a sintered component or to be manufactured using a formative method, in particular by means of 3D printing, metal injection moulding, selective laser melting or selective laser sintering. Sintering or formative manufacturing are cost-effective production methods by which, in addition, workpieces of virtually any desired shape can be produced in a single operation. It is consequently possible to avoid high-outlay and costly two-step manufacturing of the yoke by means of turning and milling.

Provision is further made, per an embodiment, for the bearing element to have a disc-shaped, in particular annular-disc-shaped, fastening portion and a tubular bearing portion, which bears the armature, is formed in one piece on the fastening portion and projects inwards from the fastening portion. The fastening portion serves to fix the bearing element on the yoke, and the bearing portion serves to bear the armature. The disc shape of the fastening portion means that, for the purpose of fastening the bearing element on the yoke in the axial direction, only a small amount of installation space is required in the axial direction. The tubular shape of the bearing portion means that the bearing element provides an axially extended bearing surface for bearing the armature. This shape of the bearing element can therefore be advantageous both in respect of the axial fastening length and in respect of the axial bearing length. The inwardly projecting bearing portion further reduces the amount of installation space required by the electromagnetic actuator in the axial direction.

In an embodiment, provision is made for the armature to comprise an armature body and an armature rod, which engages through the armature body and is fixed in the armature body. The two-part construction of the armature makes it possible for different materials to be used for the armature body and the armature rod. The armature rod can be fixed, for example, by means of a press fit, of a form fit or of welding, soldering or adhesive bonding.

The armature rod can engage through a central bore of the core and be mounted in the central bore of the core. At least in one position of the armature, the armature rod projects outwards out of the core, in order to actuate for example a slide of a valve connected to the electromagnetic actuator. In addition, the core is used in order to mount the armature opposite the yoke.

In an embodiment, provision is made for the armature rod to engage through the bearing element and to be mounted in the bearing portion of the bearing element. In other words, the bearing for the armature is formed by an inner surface of the bearing portion of the bearing element and an outer-surface portion of the rod of the armature.

Provision is also made, per an embodiment, for the armature body to have a cylindrical aperture, which is formed in an end surface of the armature body oriented towards the bearing element and in which the bearing portion of the bearing element engages when the armature body is in abutment with the fastening portion of the bearing element. The cylindrical aperture makes it possible for the armature body, in one position, to come into abutment with the fastening portion of the bearing element, the aperture providing an accommodating space for the bearing portion of the bearing element. This can allow the amount of installation space required by the electromagnetic actuator in the axial direction to be small.

In an embodiment, provision is made for the bearing portion to engage in the aperture of the armature body in any position of the armature body. In other words, in any position of the armature body, there is an axial overlap between the bearing portion and the armature body, as a result of which the amount of installation space required in the axial direction is further reduced.

In an embodiment, provision is made for a radial inner surface of the aperture of the armature body to be mounted on a radial outer surface of the bearing portion of the bearing element. In this variant, corresponding surfaces of the armature body and of the bearing portion form the bearing for the armature.

In an embodiment, provision is made for the yoke to have a preferably cylindrical aperture, which is formed in an outer end surface of the yoke and in which the fastening portion of the bearing element is fixed. The aperture allows the bearing element to be recessed in the yoke, as a result of which the amount of installation space required in the axial direction is further reduced.

The fastening portion of the bearing element may be press-fitted in the aperture of the yoke. The bearing element is thus retained in the yoke by means of a press fit.

In an embodiment, provision is also made for the yoke to have a disc-shaped, in particular annular-disc-shaped, radial portion and a tubular axial portion, which is formed in one piece on the disc-shaped radial portion and projects inwards from the disc-shaped radial portion. The yoke formed in this way conducts the magnetic flux to particularly good effect according to the embodiment, as a result of which the magnetic circuit of the electromagnetic actuator is improved.

In an embodiment, the axial height of the radial portion is ideally greater than the radial thickness of the axial portion, preferably at least 1.5 times, preferably at least 1.8 times, particularly preferably at least 2 times, greater than the radial thickness of the axial portion. These dimensioning ratios of the radial portion and of the axial portion are associated with a pronounced magnetic flux in the yoke. This can be advantageous per an embodiment, in particular for a yoke in the form of a sintered component or formed using a formative method (see above), in order thus to provide a sufficient concentration of magnetic-field lines in the axial portion.

In an embodiment, provision is made for the housing to have a cylindrical circumferential wall with an encircling step, which is formed along an inner side of a periphery of the circumferential wall and in which the radial portion of the yoke is fixed. The step forms an abutment surface for the yoke and makes it easier for the yoke to be positioned precisely in the housing.

In an embodiment, provision is also made for the radial portion of the yoke to be press-fitted in the step of the circumferential wall. The yoke is thus retained in the housing by means of a press fit.

In an embodiment, provision is made for the coil body to be fixed on an outer circumferential surface of the axial portion of the yoke and/or on an outer circumferential surface of the core. This renders dedicated means for retaining the coil body superfluous, which is associated with a small number of components and straightforward assembly of the electromagnetic actuator.

In an embodiment, provision is made for the coil body to be retained on an outer circumferential surface of the axial portion of the yoke and/or on an outer circumferential surface of the core in a force-fitting or form-fitting manner. The coil body is secured within the housing by means of the force fit or of the form fit.

In an embodiment of the proposal, provision is made for the core to have a cylindrical aperture for accommodating the armature body, said aperture being formed in an inwardly oriented end surface of the core. In other words, it is possible for the armature body, in one position of the armature, to engage in the core, as a result of which the axial length of the electromagnetic actuator is reduced.

In an embodiment, provision is made for a radial outer surface of the armature body to be mounted on a radial inner surface of the aperture. In this variant, corresponding surfaces of the armature body and of the core form the bearing for the armature.

In an embodiment, provision is also made for the aperture, together with the axial portion of the yoke, to define an armature space for the armature body. The armature space defines the stroke of the armature and thus of the electromagnetic actuator.

The core and the yoke may be spaced apart axially from one another. The axial spacing establishes the stroke of the armature. In addition, the axial spacing prevents any direct magnetic flux between the core and the yoke.

In an embodiment, the electromagnetic actuator also comprises a socket element, which is provided for receiving a corresponding plug and is arranged on the outer end surface of the yoke. The socket element allows straightforward connection of the electromagnetic actuator to a voltage source and/or straightforward disconnection of the electromagnetic actuator from a voltage source, for example for maintenance purposes.

In an embodiment, provision is made for the socket element to be adhesively bonded to the outer end surface of the yoke. The adhesive bonding creates surface-area fastening of the socket element on the yoke, which constitutes a particularly secure connection between the socket element and the yoke.

In an embodiment, provision is additionally made for the socket element to have at least two electrical contacts for establishing electrically conductive contact with two corresponding electrical contacts of a plug, each connected in electrically conductive fashion to the at least one coil winding. Two electrical contacts are necessary for connecting two poles of a voltage source. In the case of a plurality of separate coil windings, a plurality of pairs of electrical contacts can be provided correspondingly.

In an embodiment, the socket element can have an aperture, which is formed in an outer surface oriented towards the yoke, and it comprises a cover plate, which is inserted into the aperture and conceals, in particular, the aperture at least to some extent. The cover plate provides for two-step fastening of the socket element on the yoke. When the cover plate is fastened on the yoke, it can prevent contamination, e.g., swarf, from penetrating into the electromagnetic actuator.

BRIEF DESCRIPTION OF THE DRAWINGS

The disclosure is illustrated schematically, in particular in an exemplary embodiment, in the drawing, in which:

FIG. 1 shows a schematic illustration of a sectional view of an electromagnetic actuator according to one embodiment of the present disclosure.

DETAILED DESCRIPTION

In the FIGURES, like or corresponding elements are each denoted by like reference signs and therefore, if not expedient, are not described anew. What is disclosed throughout the description can be transferred analogously to like components with like reference signs or like component descriptions. It is also the case that the positional information selected in the description, e.g. above/top, below/bottom, lateral, etc., relates to the FIGURE directly described and illustrated and, in the case of the position being changed, can be transferred analogously to the new position. Furthermore, it is also possible for individual features or combinations of features from the different exemplary embodiments shown and described to constitute independent or inventive solutions or solutions according to the disclosure.

FIG. 1 shows an embodiment of an electromagnetic actuator 1, which is used for example for actuating a valve. The electromagnetic actuator 1 in this embodiment comprises, in the first instance, a housing 12. The housing 12 has a cylindrical circumferential wall 13 with an encircling step 14, which is formed along an inner side of an axial periphery of the circumferential wall 13.

The electromagnetic actuator 1 additionally comprises a core 10 with a central bore, the central core being arranged in the housing 12 at an axial end of the housing 12 which is located opposite the step 14. The core 10 additionally has a cylindrical aperture 15, which is formed in an inwardly oriented end surface of the core 10.

The electromagnetic actuator 1 also comprises a yoke 3, which is designed in the form of a sintered component or is manufactured using a formative method, for example by means of 3D printing, metal injection moulding, selective laser melting or selective laser sintering, and is arranged in the housing 12. For this purpose, the yoke 3 has an annular-disc-shaped radial portion 30, which is fixed, more specifically press-fitted, in the encircling step 14. The yoke 3 additionally has a tubular axial portion 31, which is formed in one piece on the annular-disc-shaped radial portion 30 and projects inwards from the annular-disc-shaped radial portion 30. In addition, the yoke 3 has a cylindrical aperture 32, which is formed in an outer end surface 33 of the yoke 3.

The axial height H of the radial portion 30 is two times greater than the radial thickness D of the axial portion 31, but can be even greater relative to the radial thickness D. However, it can also be sufficient for the axial height H to be at least 1.5 times greater than the radial thickness D.

The core 10 and the yoke 3 are spaced apart axially from each other and are arranged opposite each other. The aperture 15 of the core 10, together with the axial portion 31 of the yoke 3, defines an armature space 11.

In addition, the electromagnetic actuator 1 comprises a coil 6 with a coil winding 61 and a coil body 60, which is fixed within the housing 12. The coil body 60 encloses the armature space 11 and carries the coil winding 61. The coil body 60 is fixed on an outer circumferential surface of the axial portion 31 of the yoke 3 and on an outer circumferential surface of the core 10. More specifically, the coil body 60 is retained on the outer circumferential surface of the axial portion 31 of the yoke 3 and on the outer circumferential surface of the core 10 in a force-fitting manner, but as an alternative, or in addition, can also be retained thereon in a form-fitting manner.

The electromagnetic actuator 1 furthermore comprises a bearing element 5, which is fixed on the yoke 3. For this purpose, the bearing element 5 has an annular-disc-shaped fastening portion 51, which is fixed, more specifically press-fitted, in the aperture 32 of the yoke 3. The bearing element 5 also has a tubular bearing portion 50, which is formed in one piece on the fastening portion 51 and projects inwards from the fastening portion 51.

The electromagnetic actuator 1 additionally comprises an armature 2, which is arranged within the armature space 11 such that it can be moved in an axial direction. The armature 2 comprises an armature body 21 and an armature rod 20, which engages through the armature body 21 and is fixed in the armature body 21.

The armature body 21 is arranged in the armature space 11, which in this way defines an axial stroke of the armature 2. The armature body 21 has a cylindrical aperture 22, which is formed in an end surface of the armature body 21 oriented towards the bearing element 5 and in which the bearing portion 50 of the bearing element 5 engages in any position of the armature body 21, in particular when the armature body 21 is in abutment with the fastening portion 51 of the bearing element 5.

The armature rod 20 engages through the central bore of the core 10 and the bearing element 5 and is mounted in the central bore of the core 10 and in the bearing portion 50 of the bearing element 5. As an alternative, or in addition, it is possible for a radial inner surface of the aperture 22 of the armature body 1 to be mounted on a radial outer surface of the bearing portion 50 of the bearing element 5 and/or for a radial outer surface of the armature body 21 to be mounted on a radial inner surface of the aperture 15 of the core 10.

The electromagnetic actuator 1 also comprises a socket element 4, which is provided for receiving a corresponding plug. The socket element 4 has an aperture 41, which is formed in an end surface oriented towards the yoke 3, and it comprises a connection plate 40, which corresponds to the aperture 41, is inserted into the aperture 41 and conceals the aperture 41 at least to some extent. The socket element 4, in particular the connection plate 40 of the socket element 4, is arranged on the outer end surface 33 of the yoke 3 and is adhesively bonded to the outer end surface 33 of the yoke 3.

The socket element 4 has at least two electrical contacts for establishing electrically conductive contact with two corresponding electrical contacts of a corresponding plug, each connected in electrically conductive fashion to the at least one coil winding 61.

The yoke 3 for the electromagnetic actuator 1 is manufactured by sintering or using a formative method, i.e. by means of 3D printing, metal injection moulding, selective laser melting, selective laser sintering or the like. In other words, the yoke 3 is not produced by means of turning and milling, i.e. by means of machining. The bearing element 5 means that the yoke 3 itself does not have any bearing function in relation to the armature 2 and, accordingly, need not be manufactured with the high level of precision involved in machining. The formative manufacturing of the yoke 3 provides cost-related advantages in relation to machining.

Possible features of the proposal will be represented in a structured way hereinbelow. The following features represented in a structured way can be combined in any desired manner with one another and can be incorporated in any desired combination in the claims of the application. It is clear to a person skilled in the art that the disclosure can be taken from the subject matter with the fewest features. In particular, it is advantageous or possible configurations, rather than the only possible configurations, of the invention which are represented hereinbelow.

The disclosure comprises:

Electromagnetic actuator for actuating a valve, comprising a housing, a core, and a yoke, which are arranged opposite one another on the housing or in the housing, having a coil body, which carries at least one coil winding, is arranged within the housing and encloses an armature space at least to some extent, having an armature, which is arranged within the armature space such that it can be moved in an axial direction, and having a bearing element, which is fixed on the yoke and has a disc-shaped, in particular annular-disc-shaped, fastening portion and a tubular bearing portion, which bears the armature and is formed in one piece on the fastening portion.

An electromagnetic actuator designed in the manner above, wherein the bearing portion projects inwards from the fastening portion.

An electromagnetic actuator designed in the manner above, wherein the yoke is designed in the form of a sintered component or is manufactured using a formative method, in particular by means of 3D printing, metal injection moulding, selective laser melting or selective laser sintering.

The disclosure also comprises:

An electromagnetic actuator for actuating a valve having a housing, a core, and a yoke, which are arranged opposite one another on the housing or in the housing, having a coil body, which carries at least one coil winding, is arranged within the housing and encloses an armature space at least to some extent, having an armature, which is arranged within the armature space such that it can be moved in an axial direction, and having a bearing element, which is fixed on the yoke and bears the armature.

An electromagnetic actuator designed in the manner above, wherein the yoke is designed in the form of a sintered component or is manufactured using a formative method, in particular by means of 3D printing, metal injection moulding, selective laser melting or selective laser sintering.

An electromagnetic actuator designed in the manner above, wherein the bearing element has a disc-shaped, in particular annular-disc-shaped, fastening portion and a tubular bearing portion, which bears the armature, is formed in one piece on the fastening portion and projects inwards from the fastening portion.

An electromagnetic actuator designed in the manner above, wherein the armature comprises an armature body and an armature rod, which engages through the armature body and is fixed in the armature body.

An electromagnetic actuator designed in the manner above, wherein the armature rod engages through a central bore of the core and is mounted in the central bore of the core.

An electromagnetic actuator designed in the manner above, wherein the armature body has a cylindrical aperture, which is formed in an end surface of the armature body oriented towards the bearing element and in which the bearing portion of the bearing element engages when the armature body is in abutment with the fastening portion of the bearing element.

An electromagnetic actuator designed in the manner above, wherein the bearing portion engages in the aperture of the armature body in any position of the armature body.

An electromagnetic actuator designed in the manner above, wherein a radial inner surface of the aperture of the armature body is mounted on a radial outer surface of the bearing portion of the bearing element.

An electromagnetic actuator designed in the manner above, wherein the yoke has a preferably cylindrical aperture, which is formed in an outer end surface of the yoke and in which the fastening portion of the bearing element is fixed.

An electromagnetic actuator designed in the manner above, wherein the fastening portion of the bearing element is press-fitted in the aperture of the yoke.

An electromagnetic actuator designed in the manner above, wherein the yoke has a disc-shaped, in particular annular-disc-shaped, radial portion and a tubular axial portion, which is formed in one piece on the disc-shaped radial portion and projects inwards from the disc-shaped radial portion.

An electromagnetic actuator designed in the manner above, wherein the axial height of the radial portion is greater than the radial thickness of the axial portion, preferably at least 1.5 times, preferably at least 1.8 times, particularly preferably at least two times, greater than the radial thickness of the axial portion.

An electromagnetic actuator designed in the manner above, wherein the housing has a cylindrical circumferential wall with an encircling step, which is formed along an inner side of a periphery of the circumferential wall and in which the radial portion of the yoke is fixed.

An electromagnetic actuator designed in the manner above, wherein the radial portion of the yoke is press-fitted in the step of the circumferential wall.

An electromagnetic actuator designed in the manner above, wherein the coil body is fixed on an outer circumferential surface of the axial portion of the yoke and/or on an outer circumferential surface of the core.

An electromagnetic actuator designed in the manner above, wherein the coil body is retained on an outer circumferential surface of the axial portion of the yoke and/or on an outer circumferential surface of the core in a force-fitting or form-fitting manner.

An electromagnetic actuator designed in the manner above, wherein the core has a cylindrical aperture for accommodating the armature body, said aperture being formed in an inwardly oriented end surface of the core.

An electromagnetic actuator designed in the manner above, wherein a radial outer surface of the armature body is mounted on a radial inner surface of the aperture.

An electromagnetic actuator designed in the manner above, wherein the aperture, together with the axial portion of the yoke, defines an armature space for the armature body.

An electromagnetic actuator designed in the manner above, wherein the core and the yoke are spaced apart axially from one another.

An electromagnetic actuator designed in the manner above and having a socket element, which is provided for receiving a corresponding plug and is arranged on the outer end surface of the yoke.

An electromagnetic actuator designed in the manner above, wherein the socket element is adhesively bonded to the outer end surface of the yoke.

An electromagnetic actuator designed in the manner above, wherein the socket element has at least two electrical contacts for establishing electrically conductive contact with two corresponding electrical contacts of a plug, each being connected in electrically conductive fashion to the at least one coil winding.

An electromagnetic actuator designed in the manner above, wherein the socket element has an aperture, which is formed in an outer surface oriented towards the yoke, and it comprises a cover plate, which is inserted into the aperture and conceals, in particular, the aperture at least to some extent.

The disclosure also comprises a method for producing a yoke for an electromagnetic actuator, in particular for an electromagnetic actuator according to an embodiment, in the case of which the yoke is manufactured using a formative method, in particular by means of 3D printing, metal injection moulding, selective laser melting or selective laser sintering.

The claims which are filed at this point with the application and those claims filed later are without prejudice for the purpose of achieving further protection.

Should it be found here upon closer examination, in particular also of the relevant prior art, that one feature or another, although advantageous, is not absolutely imperative in relation to the aim of the disclosure, then, of course, the attempt will be made to achieve a wording which no longer has such a feature, in particular in the main claim. It is also the case that such a sub-combination is covered by the disclosure of this application.

It should also be noted that the configurations and variants of the disclosure which are described in the various embodiments and shown in the FIGURES can be combined in any desired manner with one another. It is possible here for individual features, or a number of features, to be interchanged as desired. These combinations of features are likewise disclosed here.

The dependency references given in the dependent claims relate to the development of the subject matter of the main claim by way of the features of the respective dependent claim. However, these should not be understood to be obviating the need to achieve independent substantive protection for the features of the appended dependent claims.

Features which have been disclosed only in the description, or also individual features from claims which comprise a number of features, can at any time be adopted in the independent claim/claims as being of importance which is essential to the disclosure for the purpose of distinguishing the disclosure from the prior art, to be precise even when such features have been mentioned in conjunction with other features or achieve particularly advantageous results in conjunction with other features.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. Electromagnetic actuator for actuating a valve, comprising a housing, a core and a yoke, which are arranged opposite one another on the housing or in the housing, having a coil body, which carries at least one coil winding, is arranged within the housing and at least partly encloses an armature space, having an armature, which is arranged within the armature space such that the armature can be moved in an axial direction, and having a bearing element, which is fixed on the yoke and has a generally disc-shaped fastening portion and a tubular bearing portion, which bears the armature and is formed in one piece on the generally disc-shaped fastening portion, wherein the tubular bearing portion projects inwards from the generally disc-shaped fastening portion, wherein the yoke has a cylindrical aperture, which is formed in an outer end surface of the yoke and in which the generally disc-shaped fastening portion of the bearing element is fixed, wherein the generally disc-shaped fastening portion of the bearing element is press-fitted in the cylindrical aperture of the yoke, wherein a radial inner surface of an aperture of an armature body is mounted on a radial outer surface of the tubular bearing portion of the bearing element.

2. Electromagnetic actuator according to claim 1, wherein the yoke is a sintered yoke or is a formative-manufactured yoke using a formative method by means of 3D printing, metal injection moulding, selective laser melting or selective laser sintering.

3. Electromagnetic actuator according to claim 1, wherein the yoke has a generally disc-shaped radial portion and a tubular axial portion, which is formed in one piece on the generally disc-shaped radial portion and projects inwards from the generally disc-shaped radial portion.

4. Electromagnetic actuator according to claim 3, wherein an axial height (H) of the generally disc-shaped radial portion is greater than a radial thickness (D) of the tubular axial portion, and/or the housing has a cylindrical circumferential wall with an encircling step, which is formed along an inner side of a periphery of the circumferential wall and in which the generally disc-shaped radial portion of the yoke is fixed, and/or the generally disc-shaped radial portion of the yoke is press-fitted in the encircling step of the circumferential wall.

5. Electromagnetic actuator according to claim 1, wherein the generally disc-shaped fastening portion is annular-disc-shaped.

6. Electromagnetic actuator for actuating a valve, comprising a housing, a core and a yoke, which are arranged opposite one another on the housing or in the housing, having a coil body, which carries at least one coil winding, is arranged within the housing and at least partly encloses an armature space, having an armature, which is arranged within the armature space such that the armature can be moved in an axial direction, and having a bearing element, which is fixed on the yoke and bears the armature, wherein the yoke is a sintered yoke or is a formative-manufactured yoke using a formative method by means of 3D printing, metal injection moulding, selective laser melting or selective laser sintering, wherein the yoke has a cylindrical aperture, which is formed in an outer end surface of the yoke and in which a generally disc-shaped fastening portion of the bearing element is fixed, wherein the generally disc-shaped fastening portion of the bearing element is press-fitted in the cylindrical aperture of the yoke, wherein a radial inner surface of an aperture of an armature body is mounted on a radial outer surface of a tubular bearing portion of the bearing element.

7. Electromagnetic actuator according to claim 6, wherein the bearing element has the generally disc-shaped fastening portion and the tubular bearing portion, which bears the armature, is formed in one piece on the generally disc-shaped fastening portion and projects inwards from the generally disc-shaped fastening portion, and/or the armature comprises the armature body and an armature rod, which extends through the armature body and is fixed in the armature body.

8. Electromagnetic actuator according to claim 7, wherein the generally disc-shaped fastening portion is annular-disc-shaped.

9. Electromagnetic actuator according to claim 7, wherein the armature rod extends through a central bore of the core and is mounted in this central bore of the core, and/or the armature rod extends through the bearing element and is mounted in the tubular bearing portion of the bearing element.

10. Electromagnetic actuator according to claim 7 wherein the armature body has the aperture, which is formed in an end surface of the armature body oriented towards the bearing element and in which the tubular bearing portion of the bearing element engages when the armature body is in abutment with the generally disc-shaped fastening portion of the bearing element, and/or the tubular bearing portion engages in the cylindrical aperture of the armature body in any position of the armature body.

11. Electromagnetic actuator according to claim 6, wherein the yoke has a generally disc-shaped radial portion and a tubular axial portion, which is formed in one piece on the generally disc-shaped radial portion and projects inwards from the generally disc-shaped radial portion.

12. Electromagnetic actuator according to claim 11, wherein an axial height (H) of the generally disc-shaped radial portion is greater than a radial thickness (D) of the tubular axial portion, and/or the housing has a cylindrical circumferential wall with an encircling step, which is formed along an inner side of a periphery of the circumferential wall and in which the generally disc-shaped radial portion of the yoke is fixed, and/or the generally disc-shaped radial portion of the yoke is press-fitted in the encircling step of the circumferential wall.

13. Electromagnetic actuator according to claim 7, wherein the core has a cylindrical aperture for accommodating the armature body, the cylindrical aperture being formed in an inwardly oriented end surface of the core, wherein a radial outer surface of the armature body is mounted on a radial inner surface of the cylindrical aperture.

14. Electromagnetic actuator according to claim 1, wherein the tubular bearing portion of the bearing element is received in the aperture of the armature body, and the reception establishes a surface-to-surface mounting between the radial inner surface of the aperture and the radial outer surface of the tubular bearing portion.

* * * * *